July 7, 1931.  J. B. SHAINLINE  1,813,430
AIRCRAFT CONSTRUCTION
Filed Sept. 21, 1929   2 Sheets-Sheet 1
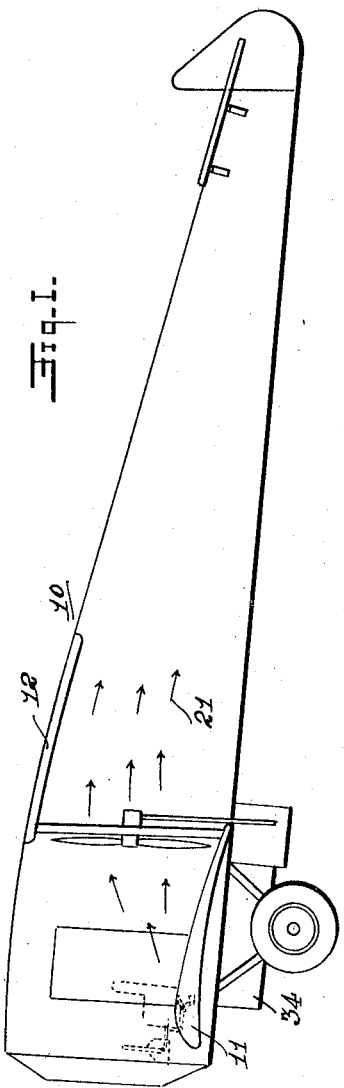
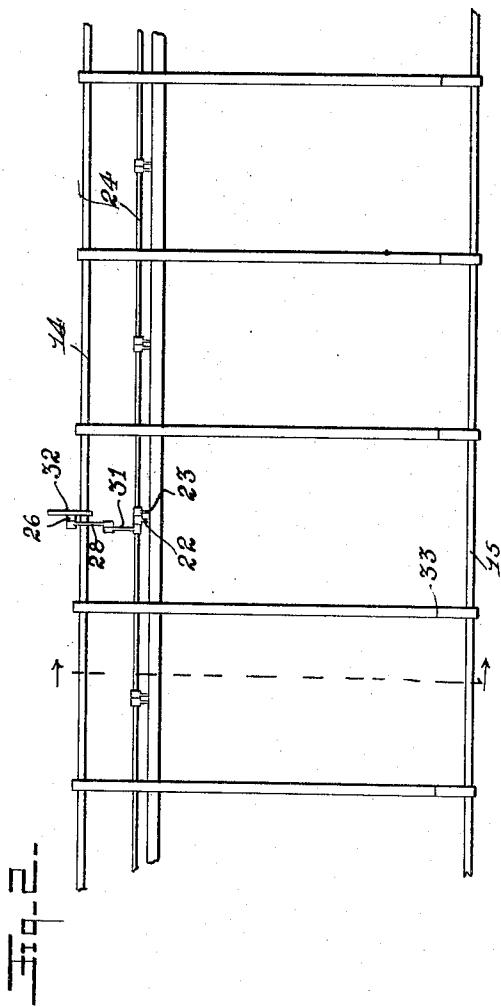
WITNESSES:
INVENTOR
Joseph B. Shainline
BY
ATTORNEY July 7, 1931.  J. B. SHAINLINE  1,813,430
AIRCRAFT CONSTRUCTION
Filed Sept. 21, 1929  2 Sheets-Sheet 2
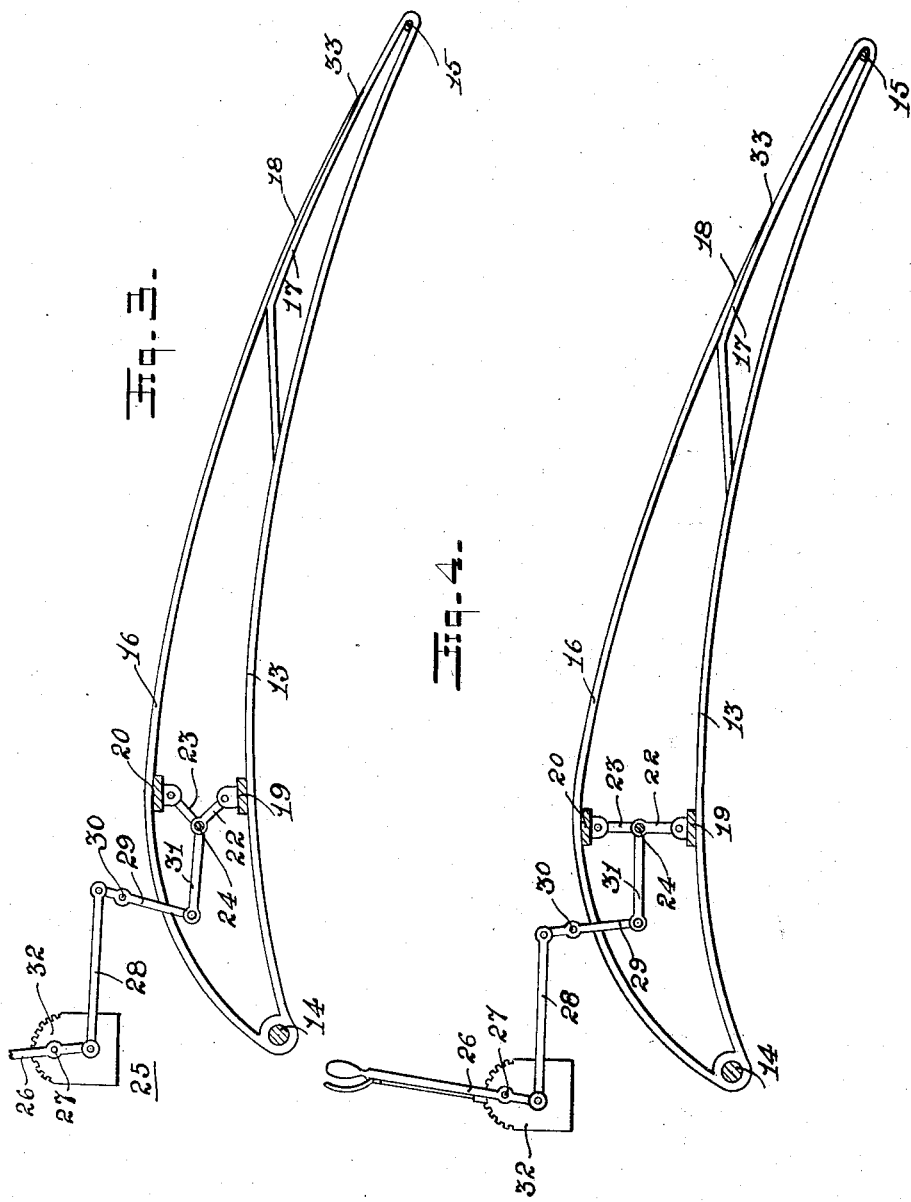

Patented July 7, 1931

1,813,430

UNITED STATES PATENT OFFICE

JOSEPH B. SHAINLINE, OF NORRISTOWN, PENNSYLVANIA, ASSIGNOR OF ONE-HALF TO HAROLD SLEMMER, OF NORRISTOWN, PENNSYLVANIA

AIRCRAFT CONSTRUCTION

Application filed September 21, 1929. Serial No. 394,186.

This invention relates to aircraft and more particularly to the construction thereof.

An undesirable feature of the present day aircraft is the lack of means for stopping or taking off the aircraft in a comparatively short distance. The necessity of such a feature has long been realized and many constructions have been provided to accomplish this purpose, but none of such constructions known to me have been commercially satisfactory.

Aircrafts have heretofore been provided with various means for altering the angle of incidence but such constructions have proven impracticable because such movement of a wing causes an immediate misalinement of the entire craft and seriously affects the stability of the craft.

The front edge of a wing is the most important portion of the wing in maintaining alinement, stability, and lifting power and it is believed by the applicant that any movement, particularly an upward or downward movement of the front edge of the wing is positively fatal to the alinement of the entire craft and the smooth operation thereof.

An object of this invention is to provide an aircraft constructed in such a manner as to permit the variation of the lifting power of the wings without affecting the stability or alinement of the craft.

Another object is to provide a craft having wings constructed and positioned in such a manner as to utilize all the dynamic forces set up by the movement of the craft through the air.

Another object is to provide means for predetermining the lifting power of the wing surfaces.

A further object of this invention is to provide an aircraft so constructed as to position its center of gravity below the axis of the craft and substantially beneath the longitudinal center line of the wing construction.

According to the invention I provide an aircraft of the biplane type having staggered wings, the lower wing being positioned forward of the upper wing and having means for expanding the concave portion thereof. The lower wing is considerably larger than the upper wing and adapted to develop the major portion of the lifting power. The upper wing being positioned above and rear of the lower wing is adapted to utilize the upward air pressure set up by the movement of the lower wing through the air.

This construction also includes the positioning of the power plant beneath the body of the plane in order to lower the center of gravity of the craft. The motor may be of considerable size and adapted to drive one or more propellers.

The drawings which are more or less diagrammatic illustrate an embodiment of this invention and the views therein are as follows:—

Fig. 1 is a side elevational view of an aircraft embodying the invention.

Fig. 2 is a partial plan view showing the skeleton of the lower wing construction.

Fig. 3 is a sectional view taken along the line 3—3 showing the position of the means for expanding the concave portion of the wing when in closed position.

Fig. 4 is a similar view of Fig. 3 showing the means in open position and the concave portion of the wing expanded.

Referring to the drawings, the aircraft which may be of any suitable type is represented in its entirety by 10, and consists of the usual fuselage, wings, landing gear, propelling means and any suitable type of controls.

According to the invention, I provide an expandible wing 11, and an upper wing 12, positioned in staggered relation to the lower wing and in the rear thereof. Means for expanding the lower wing and a power plant positioned beneath the main body portion of the craft.

The expandible lower wing 11, may be provided with any suitable covering, preferably metal. The frame work of the lower wing is adapted to extend through the bottom of the fuselage and form a part thereof, the skeleton of both the right and left lower wings forming a continuous structure. The ribs in the lower wing are preferably provided with a lower member 13, rigidly fixed to the front and rear spars 14 and 15, the upper member 16 is made from any suitable flexible material and may be movably attached to the front spars 14, an intermediate member 17 which may be a continuation of member 13 folded back on itself around the rear spar 15 for forming a support for the skirt portion 18 of the rear part of member 16 for permitting slidable movement between the parts 17 and 18. Intermediate spars 19 and 20 are positioned between the members 13 and 16 and fixed to the inner surfaces of the members 13 and 16 respectively and in perpendicular relation one to the other. The spars 19 and 20 extend the entire length of the skeleton of the lower wing.

The upper wing 12 which is preferably smaller than the lower wing 11, may be constructed of any suitable rigid ribs and spars and provided with any suitable covering such as canvas or metal. The wing 12, is positioned in staggered relation to the lower wing 11 and fixed at a pre-determined angle of incidence for utilizing the lifting power of the air pressure represented by 21 passing over the concave portion of the lower wing 11. The entering edge of the upper wing is also provided with a concave surface adjacent thereto for utilizing the dynamic forces of the air passing thereover.

The means for actuating the expandible wing 11, consists of toggle arms 22 and 23 having their ends pivotally connected to the spars 19 and 20 respectively. These toggle arms are provided at each of the ribs throughout the skeleton structure. The free ends of the toggle arms are pivotally connected by means of a rod 24 extending the entire length of the structure (see Fig. 2). All of the ends of the toggle arms are pivoted.

The means for actuating the toggle arms may be of any suitable control structure, such as shown in its entirely by 25. Control structure 25 consists of a control handle 26 disposed in the driver's cockpit or compartment fulcrumed at 27. The lower end of the control handle 26 is pivotally connected to a link 28 and the link 28 is pivotally connected to a lever 29 which is fulcrumed on a stationary pivot 30. A rod 31 is provided for pivotally connecting the link 24 to the lever 29. The link 31 is preferably positioned to connect rod 24 at a point substantially at the middle of rod 24.

The handle 26 is also provided with a means 32 for maintaining it in any pre-determined position. It can be seen therefore that by actuating the handle 26, the toggle arms 22 and 23 may be moved to open or closed position as desired.

The skirt or rear end 18 of the rib 16 being slidably secured with the members 17 is permitted to move the small amount required to expand the wing and of course, the metal or other covering disposed on the wing skeleton must be divided at the point 33 for permitting slidable movement of the members 17 and 18.

By placing the power plant 34 beneath the body structure the center of gravity of the entire plane is lowered and this power plant may be shifted to any desired position according to the structure of various planes to that point which will place the center of gravity at a balanced point so that the plane will not be either nose heavy or tail heavy and also since the center of gravity is below the center line of the plane, the plane will tend to fall right side up in case of an accident instead of falling nose first or tail first as is usually the case. Obviously with the center of gravity placed in this neutral position and below the center line of the entire plane, the hazard of tail-spinning will be eliminated.

The present construction provides a plane that is easily and gracefully operated and the manner in which the wings are expanded does not in any way interfere with the front edge or the angle of incidence of the wings, but permits the concave portion of the wings to be expanded for attaining a greater lifting power at a given speed as well as to retract the concave portion for lessening the lifting power and attaining greater speed.

While I have illustrated and described this invention in connection with a biplane, it will be obvious to those skilled in the art that the invention may be utilized with a monoplane or a plane having any number of wings.

Of course, the aircraft construction illustrated may be modified and changed in various ways without departing from the invention herein set forth and hereafter claimed.

This invention is hereby claimed as follows:

1. A skeleton for an aircraft wing consisting of ribs and spars, the ribs having a rigid lower member fixed to the front and rear spars and an upper member turnably fixed to the front spar and slidably secured to another member positioned at the rear of the wing and connected to the rear spar, and means positioned between intermediate spars for expanding the wing.

2. An airplane wing skeleton comprising lower ribs fixed as arches between fore and aft spars, upper ribs attached to the fore spar and extending toward the aft spar and having intermediate cambers, a spar fixed substantially at the crown of the arches of the lower ribs, a spar carried by the upper ribs substantially at the line of maximum camber, and means acting between said last mentioned spars adapted to vary the camber.

3. An airplane wing skeleton comprising lower ribs fixed as arches between fore and aft spars, upper ribs pivotally attached to the fore spar and extending toward the aft spar and having intermediate cambers, a spar fixed substantially at the crown of the arches of the lower ribs, a spar carried by the upper ribs substantially at the line of maximum camber, and means acting between said last mentioned spars adapted to vary the camber.

4. An airplane wing skeleton comprising lower ribs fixed as arches between fore and aft spars, upper ribs attached to the fore spar and extending toward the aft spar and having intermediate cambers, means carried by the lower ribs adjacent the aft spar to slidingly support the aft ends of the upper ribs, a spar fixed substantially at the crown of the arches of the lower ribs, a spar carried by the upper ribs substantially at the line of maximum camber, and a toggle acting between said last mentioned spars adapted to vary the camber.

5. An airplane wing skeleton comprising lower ribs fixed as arches between fore and aft spars, upper ribs attached to the fore spar and extending toward the aft spar and having intermediate cambers, means carried by the lower ribs adjacent the aft spar to slidingly support the aft ends of the upper ribs, a spar fixed substantially at the crown of the arches of the lower ribs, a spar carried by the upper ribs substantially at the line of maximum camber, a toggle acting between said last mentioned spars adapted to vary the camber, and means convenient to the operator for actuating the toggle.

In testimony whereof I have signed my name to this specification.

JOSEPH B. SHAINLINE.